Aug. 18, 1925.

H. H. JOHNSON

FISHLINE FLOAT

Filed Feb. 11, 1924

1,549,881

Inventor
Hastings H. Johnson
By his Attorneys
Merchant and Kilgore

Patented Aug. 18, 1925.

1,549,881

UNITED STATES PATENT OFFICE.

HASTINGS H. JOHNSON, OF MINNEAPOLIS, MINNESOTA.

FISHLINE FLOAT.

Application filed February 11, 1924. Serial No. 691,999.

*To all whom it may concern:*

Be it known that I, HASTINGS H. JOHNSON, a citizen of the United States, residing at Minneapolis, in the county of Hennepin and State of Minnesota, have invented certain new and useful Improvements in Fishline Floats; and I do hereby declare the following to be a full, clear, and exact description of the invention, such as will enable others skilled in the art to which it appertains to make and use the same.

My invention provides an extremely simple and highly efficient fish line float capable of quick application to a line, quick adjustment thereon, and quick removal therefrom, and, generally stated, the invention consists of the novel construction, combinations and arrangements of parts hereinafter described and defined in the claims.

The body of the float may take various shapes and may be made of any suitable material whose specific gravity is materially less than that of water, but, advisably, the float body is constructed out of cork and made approximately egg-shaped.

In the accompanying drawings, which illustrate the commercial forms of the improved float, like characters indicate like parts throughout the several views.

Referring to the drawings.

Figure 4:
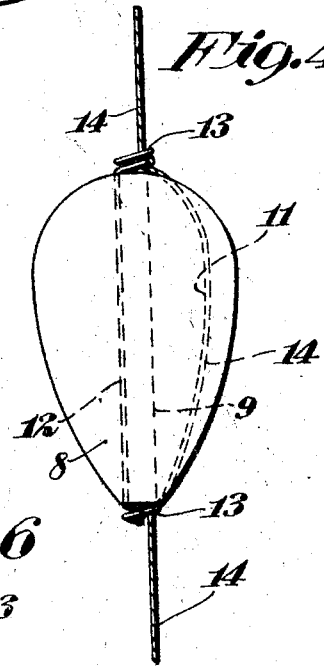
Fig. 4 is a side elevation showing the float applied to a fish line.
Figure 3:
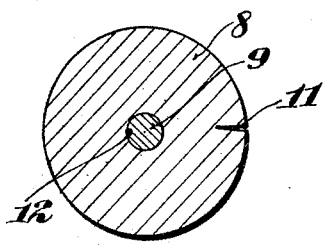
Fig. 3 is a horizontal section taken on the line 3—3 of Fig. 2.
Figure 6:
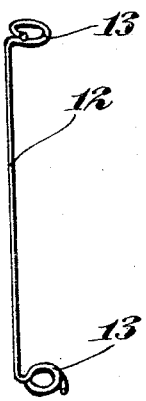
Fig. 6 is a perspective showing in detail a removable line guide.

The float body, which, as illustrated, is of the character above indicated, to wit: is constructed from cork and made approximately egg-shaped, is indicated by the numeral 8 and is provided with an axial passage to receive a removable core 9, preferably of wood and provided with a longitudinal groove 10. The cork body 8 illustrated in Figs. 1, 2, 3 and 4 is provided with a line-receiving slit or narrow channel 11 that extends nearly or quite from end to end thereof. This channel 11 is preferably such as would be produced by a knife, and while it is cut deepest at its central portion, the bottom of said channel, nevertheless, follows a curved line that is furthest from the axis of the float body at its central portion. As an efficient line guide, I provide a wire 12, the body portion of which is straight and adapted to fit within the groove 10 of the core 9, and the ends of which are laterally bent and curved to form line-guiding eyes or coils 13. It is important to note that at least one of the coils 13 and preferably the lower coil is of a diameter not greater than the diameter of the core 9, so that it may be passed with the core through the axial passage in the float body 8, when, of course, said coil is turned into concentric alignment with said core. This enables the core and line guide to be inserted in position and there held in the simplest possible way and provides extremely simple and efficient construction. In the insertion of the core, its groove 10 should be turned diametrically opposite to the slit 11, so that when the fish line 14 is applied through the eyes 13 and inserted in the slit 11, as shown in Fig. 4, the tension on the line will cause the eyes 13 to assume positions concentric to the axis of the core 9 and float 8.

Figure 1:
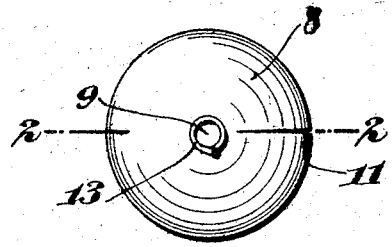
Fig. 1 is a plan view of the improved float.
Figure 7:
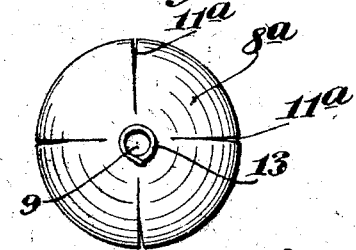
Fig. 7 is a view corresponding to Fig. 1, but illustrating a multiple arrangement of the line-receiving slot in the float body.
Figure 2:
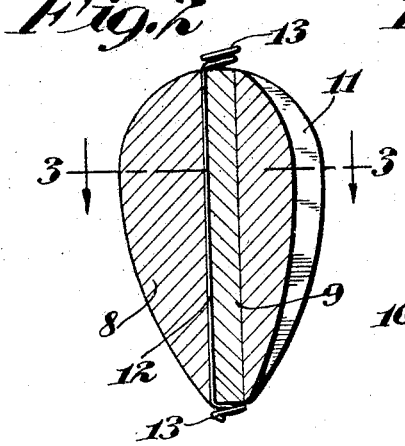
Fig. 2 is a vertical section taken on the line 2—2 of Fig. 1.
Figure 5:
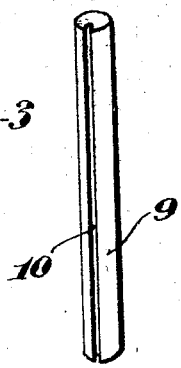
Fig. 5 is a perspective showing in detail a removable float core.

Of course, when the line is applied as shown in Fig. 4, the core, even if loose, could not get out of position. If desired, the core could be cemented within the float body, but this is not necessary and usually not desirable, because it is preferable to have the core removable. When the line is thus applied as shown in Fig. 4, it is evident that a little tension on the line will cause the same to be pinched by the converging walls of the slit 11, so as to hold the float in any adjustment in which it may be set, and, moreover, aside from the pinching action of the walls of the slit 11, produced by making the same convergent, there is a frictional action produced by the curved or offset line of the bottom of the slit in respect to the axis of the line 14 and of the float. The line, as is evident, may be placed within or removed from the guide eyes or coils 13 simply by pressing the same laterally between the convolutions thereof. The core 9, when made of wood, would, of course, have the grain of the wood extended longitudinally thereof, so that it would be strong against lateral bending or breaking and, hence, when applied in a cork float body, will very greatly reinforce and strengthen the same, and when made of light wood, will not materially add to the weight of the float. The guide eyes, being formed integral with a common stem or piece of wire, cannot get loose and are entirely free from the several objections found in the use of such devices as screw eyes and the like. The float, when applied to a line, is capable of the quickest kind of slidable adjustment thereon and will be securely held in any position in which it may be set. The float shown in Fig. 7 is like that described, except that the float body 8ª is provided with a plurality of circumferentially spaced radial slits 11ª. This plural arrangement of the line-holding slits makes it possible, by rotation of the core, to set the guide eyes to receive the line when the latter is placed in any one of the several slits. The pinching action of the line is important, and after the float has been used for a long time, the line may wear the walls of a slit so that the pinching action is decreased, but when this occurs, readjustment for another slit will extend the life of the float.

The float described may be made at small cost and it has been found efficient in actual practice.

What I claim is:

1. A fish line float comprising a float body having an axial passage, a core inserted into said axial passage, one of said elements having a groove adjacent to one side of said core and extended longitudinally thereof, and a fish line guide comprising a piece of wire seated within said groove and bent at its ends to form longitudinally offset line-guiding coils or loops, said float body having a longitudinal line-guiding groove located on that side that is opposite to said groove.

2. A fish line float comprising a float body having an axial passage, a core inserted into said axial passage and provided with a longitudinal groove offset from its axis, and a fish line guide comprising a piece of wire seated within the groove of said core and bent at its ends to form longitudinally offset line-guiding coils, said float body having a longitudinal line-guiding groove located on that side that is diametrically opposite to the groove in said core.

3. A fish line float comprising a float body having an axial passage, a core insertable into the axial passage of said float body and provided with a longitudinal groove, and a fish line guide comprising a piece of wire fitting within the groove of said core and bent at its ends to form laterally offset line-guiding eyes or coils.

4. A fish line float comprising a float body having an axial passage, a core insertable into the axial passage of said float body and provided with a longitudinal groove, and a fish line guide comprising a piece of wire fitting within the groove of said core and bent at its ends to form laterally offset line-guiding eyes or coils, at least one of which eyes or coils is of a diameter not greater than that of said core, whereby it may be passed with the core through the axial passage of said float body.

In testimony whereof I affix my signature.

HASTINGS H. JOHNSON.